(12) United States Patent
Ferrucei

(10) Patent No.: US 7,239,508 B2
(45) Date of Patent: Jul. 3, 2007

(54) COMPUTER LAPTOP FLIP AND LIFT APPARATUS

(75) Inventor: David A. Ferrucei, Yorktown Heights, NY (US)

(73) Assignee: Lenovo (Singapore) Pte Ltd., Singapore (SG)

(*) Notice: Subject to any disclaimer, the term of this patent is extended or adjusted under 35 U.S.C. 154(b) by 462 days.

(21) Appl. No.: 10/897,110

(22) Filed: Jul. 23, 2004

(65) Prior Publication Data

US 2006/0017753 A1    Jan. 26, 2006

(51) Int. Cl.
*H05K 7/00* (2006.01)
*G09G 5/00* (2006.01)

(52) U.S. Cl. ............... 361/683; 361/680; 361/681; 345/905; 345/156

(58) Field of Classification Search ............... 345/156, 345/901, 905; 361/600, 610, 679, 680, 681, 361/683
See application file for complete search history.

(56) References Cited

U.S. PATENT DOCUMENTS

2003/0052857 A1* 3/2003 Pappas ............... 345/156
2003/0168558 A1* 9/2003 Mallory et al. ........ 248/163.1
2004/0001306 A1* 1/2004 Oakley ............... 361/683
2004/0120106 A1* 6/2004 Searby et al. ........ 361/683
2005/0057892 A1* 3/2005 Ghosh et al. ........ 361/680

* cited by examiner

*Primary Examiner*—Amr A. Awad
*Assistant Examiner*—Dennis Joseph
(74) *Attorney, Agent, or Firm*—Whitham, Curtis, Christofferson & Cook, PC

(57) ABSTRACT

The laptop flip and lift apparatus enables the screen of a laptop computer to be positioned at a height similar to that of a desktop computer. This is accomplished by providing a set of legs that can be extended from the body of the laptop. In addition, the hinge of the laptop rotates such that the body of the laptop can be positioned behind the screen. When in this configuration, the keyboard of the laptop faces down toward the desk surface. Users of this apparatus could attach a keyboard, mouse and/or other ancillary devices to the laptop using it as if it were a desktop unit.

10 Claims, 4 Drawing Sheets

COMPUTER LAPTOP FLIP AND LIFT APPARATUS

BACKGROUND OF THE INVENTION

1. Field of the Invention

The present invention generally relates to a lifting apparatus that raises the relative height of a laptop computer screen to more closely resemble the height of a desktop computer screen.

2. Background Description

Laptop computers by their design are small compact devices. This is desirable when working in a confined area. However, when laptop users are working at a desk, the small size of the laptop computer places the screen below proper height relative to eye level of the user. In addition, the keyboard of a laptop, in order to fit within the restricted size profile, has a reduced key set. Users frequently connect standard desktop style keyboards and other ancillary devices to the laptop when working at a desk. This, however, does not address the screen height issue. Some users have attempted to solve this problem by placing the laptop on a box, pile of books or other methods to raise the height of the screen. In order to fit the laptop keyboard and the desktop keyboard on the desk, the screen needs to be at an uncomfortable distance from the user.

SUMMARY OF THE INVENTION

It is therefore an object of the present invention to provide a means for lifting the screen of a laptop to be positioned at an ergonomically correct height relative to eye level of the user.

It is still a further object to raise the screen while maintaining a comfortable distance from the user to the screen.

According to the invention, a flip and lift apparatus is provided that raises the height of the screen relative to the eye level of the user. The flip and lift apparatus also rotates the laptop keyboard behind the screen. By positioning the keyboard behind the screen, the screen of the laptop can be located closer to the user at a more comfortable distance.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
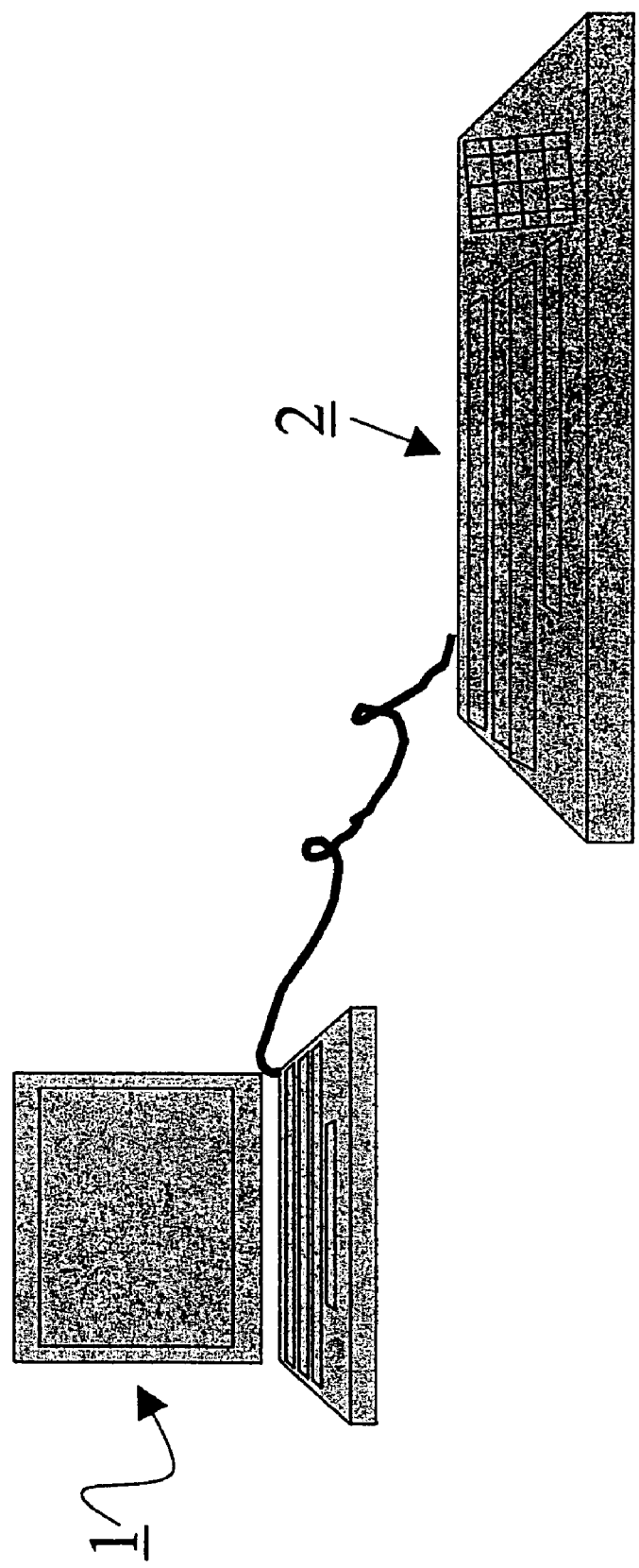
FIG. 1 is a view of a laptop computer connected to an ancillary device without the flip and lift elements

Referring now to the drawings, and more particularly to FIG. 1, there is shown a typical configuration of a laptop computer 1 used as a desktop computer. The laptop computer 1 is connected to a keyboard 2 or other ancillary devices to include but not be limited to a mouse, a printer, a microphone, a PDA docking station, etc. This configuration allows a user to keep all files in a single device but provides the enhanced data entry capabilities of the ancillary devices. However, this is not an optimal configuration as the laptop computer is lower than typical desktop computers. This causes the user to look down at the computer instead of having the screen at eye level relative to the user. The eye level height of the computer screen reduces neck and back strain while that can occur when working at a laptop computer.

Figure 2:
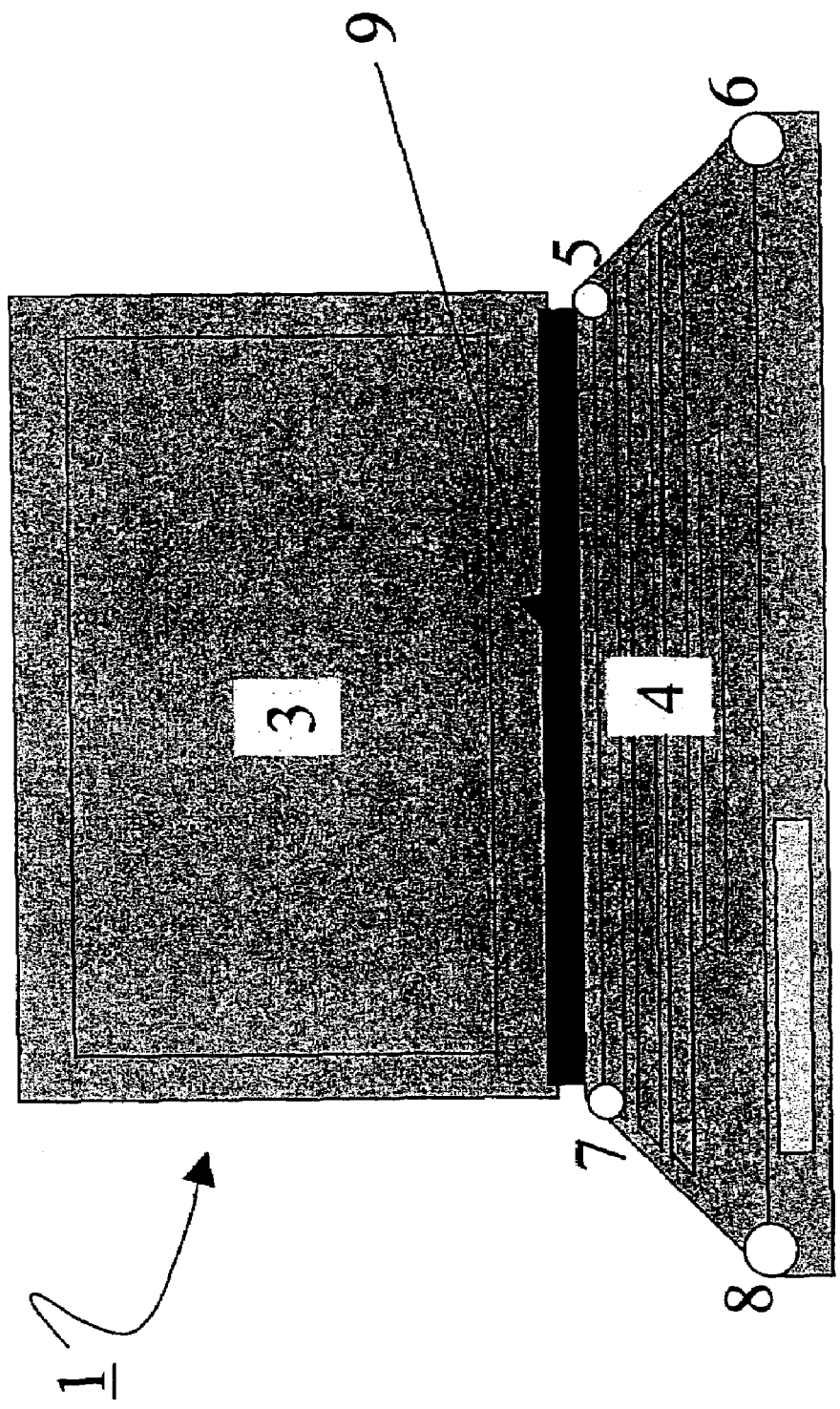
FIG. 2 is a view of a laptop computer showing the flip and lift elements.

The flip and lift apparatus is designed to provide a more ergonomic configuration for a laptop computer 1. Looking now at FIG. 2, the laptop computer 1 includes a screen 3 and a body 4. The body 4 of a laptop computer 1 typically has a keyboard, touch mouse, data connectors, and power input as well as any cd-rom or floppy disk receptacles. To the standard laptop computer 1, extendable legs (5, 6, 7, and 8) are added, preferably at the four corners of the body 4. In FIG. 2, the legs are shown in the retracted position so that the legs appear to be small bumps or other slightly raised protrusion on the top of the laptop body 4 and are located on the same side of the body 4 as the keyboard. (However, the position of the extendable legs may vary as a design choice and need not be on the same surface as the keyboard or at the corners.) The hinge 9 of the laptop 1, unlike currently available laptops as depicted in FIG. 1, is a freely rotating hinge 9 such that the screen 3 can rotate relative to the body 4 from 0° to 270° or preferably approximately 360° to allow the screen to remain facing forward while the body is flipped backwards. When the body is flipped backwards, the keyboard would face downward and be unaccessible to the user. Also shown in FIG. 2 is an optional connector panel similar to the connector interfaces located currently on the back of the body 4 of the laptop 1. This optional connector panel 10 would provide the same or similar connectors for the ancillary devices (e.g., keyboard, mouse, etc.) so that the cables connecting these ancillary devices would be located at the back of the desk when the body 4 is flipped in the backward position.

Figure 3:
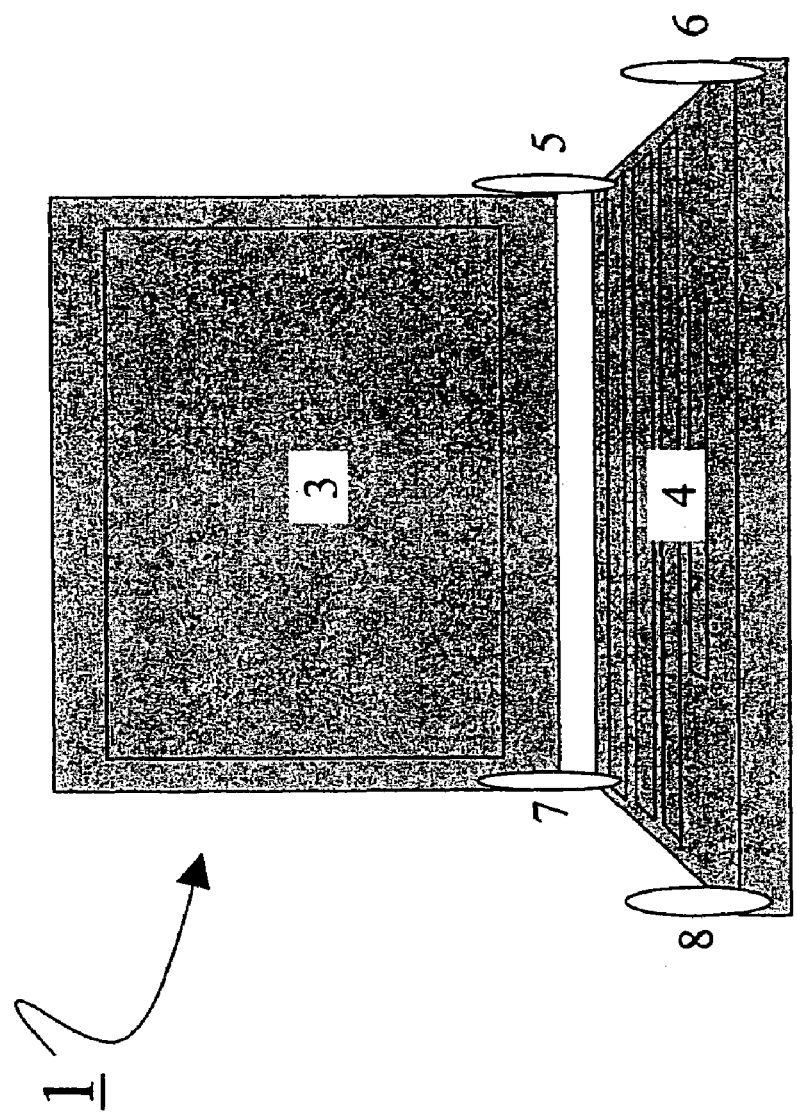
FIG. 3 is a view of the legs in an extended position.

Referring now to FIG. 3, the extendable legs (5, 6, 7, and 8) are shown in a deployed position. When deployed, or extended, the legs (5, 6, 7, and 8) protrude up from the top of the body 4. When in the fully extended position, the legs can be up to 6 inches above the top of the body 4 so that when the keyboard is flipped backward and is facing downward, the body 4 is lifted up to 6 inches about the surface or the desk. By lifting the body 4, the screen is also raised to an ergonomically proper height. The extendable legs can be extended less than the maximum height of 6 inches yet more than the minium height of 0 inches so that they are adjustable to the user's preference.

Figure 4:
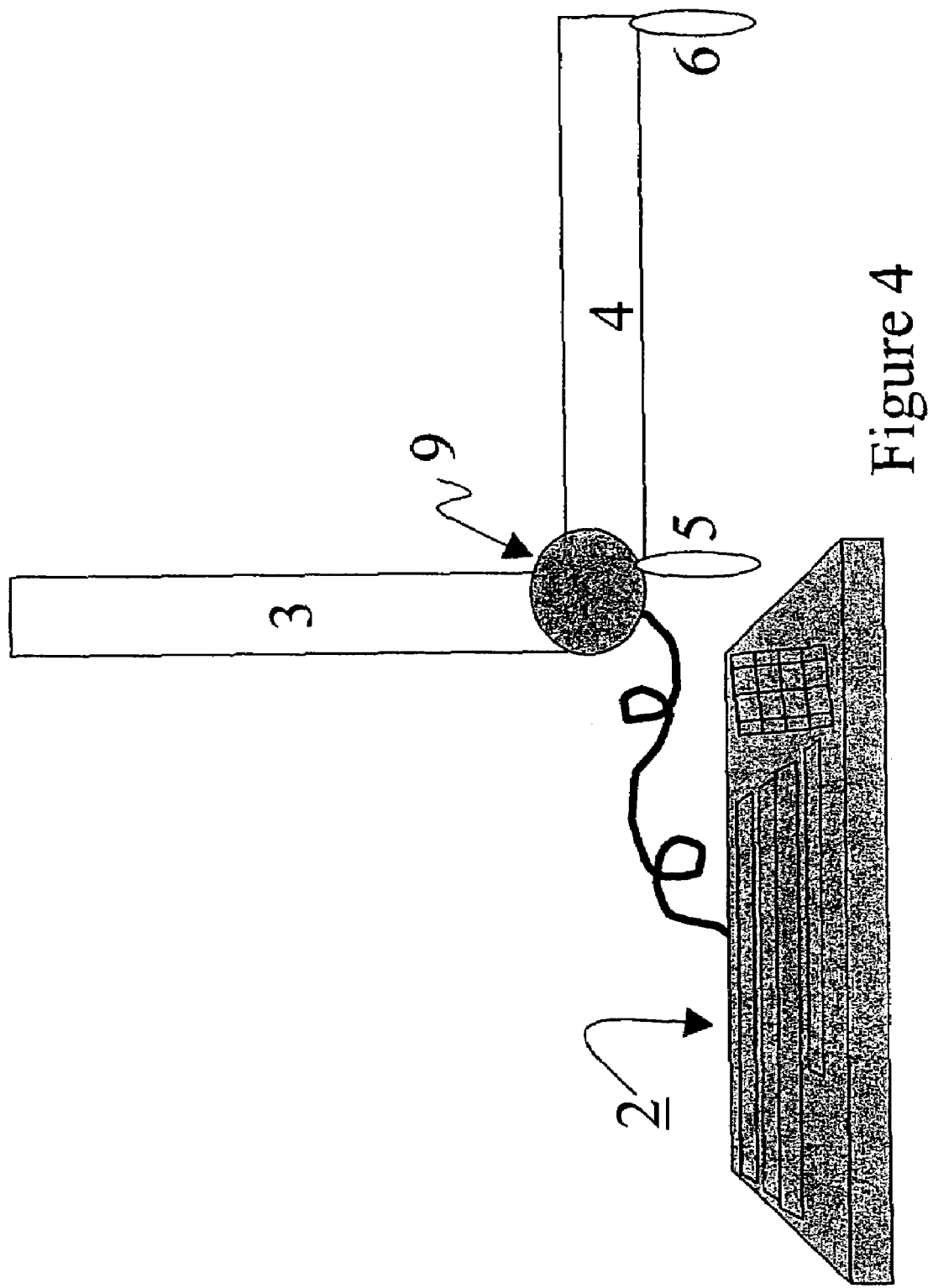
FIG. 4 is a side view of the laptop computer with the lift and flip elements enabled.

Finally, FIG. 4 shows a side view of the laptop computer 1 with the body 4 flipped backward and the legs (5 and 6) extended to support the body 4 above the desk surface. The screen 3 is shown as facing forward relative to the user and a keyboard 2 or other ancillary device is connected to the body 4 of the laptop computer 1.

While the invention shows four extendable legs supporting the body, it should be understood by those skilled in the art that the number, size and shape of the legs can be modified within the scope and spirit of the appended claims. In addition, the legs may be fixed to the body 4 or separable therefrom (e.g., pegs which can be inserted into bores in the body, etc.)

Furthermore, while the invention has been described in terms of a single preferred embodiment, those skilled in the art will recognize that the invention can be practiced with modification within the spirit and scope of the appended claims.

What we claim as new and desire to secure by Letters Patent is as follows:

1. A laptop computer, comprising:
a screen having a top edge and a bottom edge;
a hinge attached to said screen, having a rotational axis extending proximal to the bottom edge of the screen;
a body attached to said hinge such that said body and said screen are movable between a flipped position and an unflipped position, and wherein said body includes a laptop bottom support surface, a keyboard support surface opposite said laptop bottom support surface, a keyboard arranged on said keyboard support surface, and a laptop top support structure comprising a plurality of legs located on the keyboard support surface, each extending an extension distance from said keyboard support surface to a distal end,
wherein said screen, hinge and body are constructed and arranged such that, in the unflipped position, the keyboard and the screen are concurrently visible and, in the flipped position, the laptop bottom support surface and the screen are concurrently visible and the bottom edge of the screen is spaced above a distal support plane having at least three of the distal ends of the legs by a flipped laptop screen height corresponding to said extension distance.

2. The laptop computer of claim 1, wherein the display screen, hinge and body are constructed and arranged such that said body and screen are rotatable in a folding manner about said axis of rotation to form an included angle between said screen and said keyboard ranging from approximately 0° to approximately 360°.

3. The laptop computer of claim 1 wherein said body further includes a back peripheral edge proximal to said hinge, a front peripheral edge opposite to said back peripheral edge, and lateral peripheral edges extending between the front and back peripheral edges, and
wherein said keyboard support surface includes corner areas proximal to intersections of said lateral peripheral edges and said front and back peripheral edges, and wherein each of said legs extends from a corresponding one of said corner areas.

4. The laptop computer of claim 1, wherein said legs are constructed and arranged to be extendable, from a retracted position to an extended position, the distal ends of the legs being further from said keyboard support surface in said extended position than in said retracted position.

5. The laptop computer of claim 4, wherein the distal ends of the legs in the retracted position are approximately flush with said keyboard support surface.

6. The laptop computer of claim 1, further comprising a screen height adjustment structure for adjusting the flipped laptop screen height when the laptop is positioned in said flipped position, said screen height adjustment structure including an extensible support structure attaching said plurality of legs to said body, wherein said extension distance is adjustable, and wherein increasing said extension distance increases said flipped laptop screen height and decreasing said extension decreases said flipped laptop screen height.

7. The laptop computer of claim 6, wherein said plurality of legs and said extensible support structure are constructed and arranged such that said flipped laptop screen height is adjustable from a first value to a second value, the difference between the first value and the second value being approximately six inches.

8. The laptop computer of claim 1, wherein said body further includes a back peripheral edge proximal to said hinge, a front peripheral edge opposite to said back peripheral edge, and lateral peripheral edges extending between the front and back peripheral edges, and further comprising:
a first connector panel located at the back peripheral edge of the body and a second connector panel located at the front peripheral edge of the body, whereby the first connector panel is in front of the screen and faces in the same direction as the screen when the laptop is in the unflipped position and the first connector is behind of and faces backward from the screen when the laptop is in the flipped position.

9. The laptop computer of claim 8, wherein the first connector panel includes at least one of a power connector, keyboard connector, mouse connector, telephone jack connector, serial data connector, and parallel data connector, and
wherein the second connector panel includes at least one connector having the same function as, and being an alternate to, a connector of the first connector panel.

10. The laptop computer of claim 1, wherein said body further includes a back peripheral edge proximal to said hinge, a front peripheral edge opposite to said back peripheral edge, and lateral peripheral edges extending between the front and back peripheral edges, and further comprising:
a structure for connecting cables to extend from the back peripheral edge of the body, from a location behind the screen, when the laptop is in the unflipped position, and for connecting cables to extend from the front peripheral edge of the body, from a location behind the screen when the laptop is positioned in the flipped position.

* * * * *